(12) United States Patent
Brudnicki et al.

(10) Patent No.: US 9,607,298 B2
(45) Date of Patent: *Mar. 28, 2017

(54) SYSTEM AND METHOD FOR PROVIDING SECURE DATA COMMUNICATION FUNCTIONALITY TO A VARIETY OF APPLICATIONS ON A PORTABLE COMMUNICATION DEVICE

(71) Applicant: Sequent Software Inc., Mountain View, CA (US)

(72) Inventors: David Brudnicki, Duvall, WA (US); Michael K Craft, Carlsbad, CA (US); Hans Reisgies, San Jose, CA (US); Andrew Weinstein, San Francisco, CA (US)

(73) Assignee: Sequent Software Inc., Santa Clara, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/293,688

(22) Filed: Jun. 2, 2014

(65) Prior Publication Data

US 2014/0289119 A1    Sep. 25, 2014

Related U.S. Application Data

(63) Continuation of application No. 13/279,184, filed on Oct. 21, 2011, now Pat. No. 8,745,716.

(Continued)

(51) Int. Cl.
*G06F 7/04* (2006.01)
*G06Q 20/32* (2012.01)
(Continued)

(52) U.S. Cl.
CPC ......... *G06Q 20/3226* (2013.01); *G06F 21/34* (2013.01); *G06F 21/74* (2013.01);
(Continued)

(58) Field of Classification Search
CPC .. G06Q 20/32; G06Q 20/341; G06Q 20/3574; G06Q 20/3229; G06Q 20/367;
(Continued)

(56) References Cited

U.S. PATENT DOCUMENTS 5,592,553 A    1/1997  Guski et al.
6,298,440 B1   10/2001 Siegel
(Continued)

OTHER PUBLICATIONS

International Search Report and Written Opinion of PCT/US11/61050 mailed Apr. 4, 2013, 8 pages.
(Continued)

*Primary Examiner* — Brian Shaw
(74) *Attorney, Agent, or Firm* — Dunlap Codding, P.C.

(57) ABSTRACT

A system for providing an application associated with a portable communication device the ability to communicate via a secure element. The system has a digital identifier and digital token operably associated with the application; a card services module that provides an application programming interface to the secure element; and a secure data table associated with the card services module. The secure data table includes a list of trusted applications each identifiable by paired digital identifier and token. The card services module [includes] compares the identifier and the token with each of the identifier-token pairs in the table until a match indicates the application is trusted. The card services module issues commands to the secure element based on an action requested by a trusted application in conjunction with the presentation of the digital token. A method of providing an application with the ability to communicate via secure element is also disclosed.

20 Claims, 9 Drawing Sheets

Related U.S. Application Data

(60) Provisional application No. 61/414,847, filed on Nov. 17, 2010.

(51) Int. Cl.

| | | |
|---|---|---|
| *G06F 21/34* | (2013.01) | |
| *G06F 21/74* | (2013.01) | |
| *G06Q 20/34* | (2012.01) | |
| *H04L 29/06* | (2006.01) | |

(52) U.S. Cl.
CPC ..... *G06Q 20/3574* (2013.01); *H04L 63/0807* (2013.01); *H04L 63/20* (2013.01)

(58) Field of Classification Search
CPC . G06Q 20/382; G06Q 20/3672; H04W 4/008; H04W 4/001; H04W 12/06; H04W 12/08; H04W 12/00; G07F 7/0826; G07F 7/082; H04L 2209/80; H04L 2209/56; H04L 2463/102; G06F 21/00; G06F 21/62; G06F 21/72; G06F 21/44; G06F 21/445; G06F 21/6218; G06F 21/6245; G06F 2221/2149; G06F 12/1483
USPC ...... 455/411, 558; 705/44, 41, 14.23, 14.38, 705/64, 65, 71, 16; 235/380, 382; 726/26, 9, 6, 2, 5, 30, 4, 18, 19, 27, 16, 726/17, 22; 713/168, 194, 165, 167
See application file for complete search history.

(56) References Cited

U.S. PATENT DOCUMENTS

| | | | |
|---|---|---|---|
| 6,470,450 B1 * | 10/2002 | Langford | ............. G06F 21/602 713/182 |
| 6,988,657 B1 | 1/2006 | Singer et al. | |
| 7,140,549 B2 | 11/2006 | De Jong | |
| 7,665,667 B2 | 2/2010 | Prevost et al. | |
| 8,332,272 B2 | 12/2012 | Fisher | |
| 8,533,796 B1 | 9/2013 | Shenoy et al. | |
| 8,639,629 B1 | 1/2014 | Hoffman | |
| 8,666,437 B2 | 3/2014 | Stromberg et al. | |
| 8,667,285 B2 | 3/2014 | Coulier et al. | |
| 8,700,729 B2 | 4/2014 | Dua | |
| 2001/0054148 A1 | 12/2001 | Hoornaert et al. | |
| 2003/0037237 A1 | 2/2003 | Abgrall et al. | |
| 2005/0043997 A1 | 2/2005 | Sahota et al. | |
| 2005/0184164 A1 | 8/2005 | De Jong | |
| 2006/0165060 A1 | 7/2006 | Dua | |
| 2007/0123305 A1 | 5/2007 | Chen et al. | |
| 2007/0192840 A1 | 8/2007 | Pesonen | |
| 2007/0254712 A1 | 11/2007 | Chitti | |
| 2008/0215883 A1 | 9/2008 | Fok et al. | |
| 2008/0229383 A1 | 9/2008 | Buss et al. | |
| 2009/0050688 A1 | 2/2009 | Kon et al. | |
| 2009/0076966 A1 | 3/2009 | Bishop et al. | |
| 2009/0122989 A1 | 5/2009 | Asnaashari et al. | |
| 2009/0198618 A1 | 8/2009 | Chan et al. | |
| 2009/0233579 A1 | 9/2009 | Castell et al. | |
| 2009/0288012 A1 | 11/2009 | Hertel et al. | |
| 2010/0153721 A1 | 6/2010 | Mellqvist | |
| 2010/0303230 A1 | 12/2010 | Taveau et al. | |
| 2010/0313196 A1 | 12/2010 | De Atley et al. | |
| 2011/0087610 A1 | 4/2011 | Batada et al. | |
| 2011/0130095 A1 | 6/2011 | Naniyat et al. | |
| 2011/0140841 A1 | 6/2011 | Bona et al. | |
| 2011/0239304 A1 * | 9/2011 | Saarisalo | ................ G06F 21/57 726/26 |
| 2011/0313870 A1 | 12/2011 | Eicher et al. | |
| 2012/0095852 A1 | 4/2012 | Bauer et al. | |

OTHER PUBLICATIONS

Globalplatform, Advancing Standards for Smart Card Growth, "GlobalPlatform Card Specification Version 2.1", Jun. 4, 2001, pp. 1-222, Copyright 2001 GlobalPlatform Inc.

Globalplatform, Advancing Standards for Smart Card Growth, "GlobalPlatform Card Specification Version 2.1.1", Mar. 25, 2003, pp. 1-237, Copyright 2003 GlobalPlatform Inc.

Globalplatform, Advancing Standards for Smart Card Growth, "GlobalPlatform Card Specification 2.1.1 Amendment A", Mar. 2004, pp. 1-10, Copyright 2004 GlobalPlatform Inc.

Globalplatform, The Standard for Smart Card Infrastructure, "GlobalPlatform Card Specification Version 2.2", Mar. 2006, pp. 1-375, Copyright 2006 GlobalPlatform Inc.

Globalplatform, The Standard for Managing Applications on Secure Chip Technology, "GlobalPlatform Card Specification, Version 2.2.1 Public Release", Jan. 2011, pp. 1-303, Copyright 2006-2011 GlobalPlatform Inc.

Globalplatform, The Standard for Managing Applications on Secure Chip Technology, "GlobalPlatform Card Confidential Card Content Management Card Specification v2.2—Amendment A, Version 1.0.1 Public Release", Jan. 2011, pp. 1-26, Copyright 2007-2011 GlobalPlatform Inc.

Office Action Summary (U.S. Appl. No. 13/447,489); dated May 21, 2015.

European Search Report issued in related European Application No. 11 841 802.9, mailed Jul. 3, 2014, 6 pages.

European Search Report for EP 11841802.9 mailed Mar. 7, 2014.

* cited by examiner

SYSTEM AND METHOD FOR PROVIDING SECURE DATA COMMUNICATION FUNCTIONALITY TO A VARIETY OF APPLICATIONS ON A PORTABLE COMMUNICATION DEVICE

CROSS REFERENCE TO RELATED APPLICATIONS

This application is a continuation of U.S. application Ser. No. 13/279,184, filed on Oct. 21, 2011, entitled "System and Method for Providing Secure Data Communication Functionality to a Variety of Applications on a Portable Device," which claims priority to U.S. Provisional Patent Application No. 61/414,847, filed on Nov. 17, 2010, entitled "System and Method for Providing Secure Data Communication Functionality to a Variety of Applications on a Portable Communication Device." The content of each of which is incorporated herein by reference in its entirety.

TECHNICAL FIELD

The present invention relates generally to the use of secure data to complete a wireless transaction, and more particularly to a system and method for providing secure data communication functionality to a variety of applications on a portable communication device.

BACKGROUND

Wireless transactions using RFID-based proximity cards are fairly common place. For instance, many workers use RFID keycards to gain access to their workplace and drivers use RFID passes to pay tolls at highway speeds. RFID, which stands for radio-frequency identification, uses electromagnetic waves to exchange data between a terminal and some object for the purpose of identification. More recently, companies have been trying to use RFIDs to supported by cellular telephones to implement an electronic payment product (i.e. credit and/or debit card). However, basic RFID technology raises a number of security concerns that have prompted modifications of the basic technology. Still, widespread adoption of RFID as a mechanism for electronic payments has been slow.

Near Field Communication (NFC) is another technology that uses electromagnetic waves to exchange data. NFC waves are only transmitted over a short-range (on the order of a few inches) and at high-frequencies. NFC devices are already being used to make payments at point of sale devices. NFC is an open standard (see, e.g. ISO/IEC 18092) specifying modulation schemes, coding, transfer speeds and RF interface. There has been wider adoption of NFC as a communication platform because it provides better security for financial transactions and access control. Other short distance communication protocols are known and may gain acceptance for use in supporting financial transactions and access control.

Many applications have been developed for use in association with portable communications devices. Some of these applications would benefit from having access to electronic funds to facilitate the consumer's consummation of a electronic transactions via those applications, such as the purchase of goods over the Internet. Still other applications have no purpose if they cannot access the secure data subsystem of the portable communication device.

Card issuers are interested in facilitating the option to pay for application usage and ecommerce using their credit/debit card products. Notwithstanding their self-interest in enabling third party applications to access their financial products, the card issuers may have serious security concerns about broad distribution of security protocols. Similarly, the third party developers may not be interested in developing financial product subroutines. Accordingly, there is a need in the industry for an electronic wallet that is accessible by third party programs to facilitate the payment of charges associated with the use of those programs. The application accessible electronic wallet may also be used via direct access by the consumer to the mobile application. Moreover, secure elements are designed to self-destruct if someone tries to improperly access the data stored within or physically tamper with the card. Thus, there is a need for an intermediary to provide safe access for third-party applications to the secure element to minimize the occurrence of inadvertent self-destruction of secure elements.

Accordingly, the present invention seeks to provide one or more solutions to the foregoing problems and related problems as would be understood by those of ordinary skill in the art having the present specification before them. These and other objects and advantages of the present disclosure will be apparent to those of ordinary skill in the art having the present drawings, specifications, and claims before them. It is intended that all such additional systems, methods, features, and advantages be included within this description, be within the scope of the disclosure, and be protected by the accompanying claims.

SUMMARY OF THE INVENTION

The present invention involves, in part, a system for providing a first application associated with a portable communication device the ability to communicate via a secure element. The system comprises a first digital identifier and a first digital token operably associated with the first application; a card services module disposed on the portable communication device and operably associated with the secure element to provide an application programming interface to the secure element; and a secure data table (electronically associated with the card service module), including a list of trusted applications each being identifiable by a paired set of digital identifier and digital token. The card services module includes means for comparing the first digital identifier and the first digital token with each of the identifier-token pairs in the secure data table until a match indicates that the first application is a first trusted application.

The card services module issues one or more commands to the secure element based on a first action requested by the first trusted application in conjunction with the presentation of the first digital token. The one or more commands issued to the secure element may result in the secure element providing data for presentation on a user interface. Where this is the case the card services module passes the data from the secure element to the first trusted application for display. In some instances where the first action may require presentation of a first argument, the card services module issues the one or more commands to the secure element based on both the first action and the first argument.

In other instances, the first action may require presentation of a first argument, the card services module issues the one or more commands to the secure element based on both the first action and the first argument. In that case the first digital token can be a global constant, the card services module further including means for replacing the global constant with a pseudo-randomly generated value based on a pre-selected seed, the pseudo-randomly generated value being saved as the first digital token in the secure data table and in operable association with the first application. In addition, the secure element could generate the pseudo-randomly generated value, and the pre-selected seed could be selected from the group comprising the first digital token global constant, the first digital identifier, an issuer of the first trust application, and combinations thereof.

Also, when the first digital token is a global constant, the card services module could further include means for replacing the global constant with a pseudo-randomly generated value based on a pre-selected seed, the pseudo-randomly generated value being saved as the first digital token in the secure data table and in operable association with the first application. In such case the secure element could generate the pseudo-randomly generated value, and if so, the pre-selected seed could be selected from the group comprising the first digital token global constant, the first digital identifier, an issuer of the first trust application, and combinations thereof.

Further, when the first digital token is a global constant, the card services module could receive in association with the first digital identifier from a central database for storage in the secure data table.

The present invention also involves, in part, a method for providing a first application associated with a portable communication device the ability to communicate via a secure element associated with the portable communication device. The method can include determining that the first application is a first trusted application on the portable communication device; requesting from via the first trusted application that a card services module disposed on the portable communication device and operably associated with the secure element, implement a first action in conjunction with the presentation of the first digital token; verifying that the first digital token is associated with the first trusted application in the secure data table; and issuing one or more commands to the secure element based on the first action requested by the first trusted application in conjunction with the presentation of the first digital token.

In some instances, when determining that the first application is the first trusted application, this method could also include comparing a first digital identifier and a first digital token operably associated with the first application with each paired set of digital identifier and digital token associated with a known trusted application until a match indicates that the first application is a trusted application, the paired sets having been stored in a secure data table on the portable communication device; and if the first application is a trusted application, binding the first application to the secure element on the portable communication device.

In such an instance when the first digital token is a global constant, the method could also include permitting the first application to the secure element on the portable communication device by replacing the global constant with a pseudo-randomly generated value based on a pre-selected seed and saving the pseudo-randomly generated value as the first digital token in the secure data table and in operable association with the first application. In such case the method could additionally include generating the pseudo-randomly generated value via the secure element, and further include selecting the seed for the pseudo-randomly generating value from the group comprising the first digital token global constant, the first digital identifier, an issuer of the first trust application, and combinations thereof.

When the one or more commands result in the secure element providing data for presentation on a user interface, the method could further include passing the data from the secure element to the first trusted application for display on the portable communication device. Also when the first action requires presentation of a first argument, the method could include issuing the one or more commands to the secure element based on both the first action and the first argument.

When the one or more commands result in the secure element providing data for presentation on a user interface, the method could also include passing the data from the secure element to the first trusted application for display on the portable communication device. Finally, when the first action requires presentation of a first argument, the method could further include issuing the one or more commands to the secure element based on both the first action and the first argument.

BRIEF DESCRIPTION OF THE DRAWINGS

For a better understanding of the present disclosure, non-limiting and non-exhaustive embodiments are described in reference to the following drawings. In the drawings, like reference numerals refer to like parts through all the various figures unless otherwise specified.

DETAILED DESCRIPTION

Figure 1A:
FIG. 1a illustrates the diagnostic agent installed in the end user's portable communication device asking whether she would like diagnostics performed following a failed attempt to use her device to conduct a secure payment transaction at a point of sale.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Portable Communication Devices

The present invention provides a system and method that can be utilized with a variety of different portable communication devices, including but not limited to PDA's, cellular phones, smart phones, laptops, tablet computers, and other mobile devices that include cellular voice and data service as well as preferable access to consumer downloadable applications. One such portable communication device could be an iPhone, Motorola RAZR or DROID; however, the present invention is preferably platform and device independent. For example, the portable communication device technology platform may be Microsoft Windows Mobile, Microsoft Windows Phone 7, Palm OS, RIM Blackberry OS, Apple OS, Android OS, Symbian, Java or any other technology platform. For purposes of this disclosure, the present invention has been generally described in accordance with features and interfaces that are optimized for a smart phone utilizing a generalized platform, although one skilled in the art would understand that all such features and interfaces may also be used and adapted for any other platform and/or device.

The portable communication device includes one or more short proximity electromagnetic communication devices, such as an NFC, RFID, or Bluetooth transceiver. It is presently preferred to use an NFC baseband that is Compliant with NFC IP 1 standards (www.nfcforum.org), which provides standard functions like peer-to-peer data exchange, reader-writer mode (i.e. harvesting of information from RFID tags), and contactless card emulation (per the NFC IP 1 and ISO 14443 standards) when paired with a secure element on the portable communication device and presented in front of a "contactless payment reader" (see below at point of sale). As would be understood in the art by those having the present specification, figures, and claims before them, the NFC IP 1 standards are simply the presently preferred example, which could be exported—in whole or in part—for use in association with any other proximity communication standard. It is further preferred that the portable communication device include an NFC/RFID antenna (conformed to NFC IP 1 and ISO 14443 standards) to enable near field communications. However, as would be understood in the art NFC/RFID communications may be accomplished albeit over even shorter ranges and potential read problems.

The portable communication device also includes a mobile network interface to establish and manage wireless communications with a mobile network operator. The mobile network interface uses one or more communication protocols and technologies including, but not limited to, global system for mobile communication (GSM), 3G, 4G, code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols to communicate with the mobile network of a mobile network operator. Accordingly, the mobile network interface may include as a transceiver, transceiving device, or network interface card (NIC). It is contemplated that the mobile network interface and short proximity electromagnetic communication device could share a transceiver or transceiving device, as would be understood in the art by those having the present specification, figures, and claims before them.

The portable communication device further includes a user interface that provides some means for the consumer to receive information as well as to input information or otherwise respond to the received information. As is presently understood (without intending to limit the present disclosure thereto) this user interface may include a microphone, an audio speaker, a haptic interface, a graphical display, and a keypad, keyboard, pointing device and/or touch screen. As would be understood in the art by those having the present specification, figures, and claims before them, the portable communication device may further include a location transceiver that can determine the physical coordinates of device on the surface of the Earth typically as a function of its latitude, longitude and altitude. This location transceiver preferably uses GPS technology, so it may be referred to herein as a GPS transceiver; however, it should be understood that the location transceiver can additionally (or alternatively) employ other geo-positioning mechanisms, including, but not limited to, triangulation, assisted GPS (AGPS), E-OTD, CI, SAI, ETA, BSS or the like, to determine the physical location of the portable communication device on the surface of the Earth.

The portable communication device will also include a microprocessor and mass memory. The mass memory may include ROM, RAM as well as one or more removable memory cards. The mass memory provides storage for computer readable instructions and other data, including a basic input/output system ("BIOS") and an operating system for controlling the operation of the portable communication device. The portable communication device will also include a device identification memory dedicated to identify the device, such as a SIM card. As is generally understood, SIM cards contain the unique serial number of the device (ESN), an internationally unique number of the mobile user (IMSI), security authentication and ciphering information, temporary information related to the local network, a list of the services the user has access to and two passwords (PIN for usual use and PUK for unlocking). As would be understood in the art by those having the present specification, figures, and claims before them, other information may be maintained in the device identification memory depending upon the type of device, its primary network type, home mobile network operator, etc.

In the present invention each portable communication device is thought to have two subsystems: (1) a "wireless subsystem" that enables communication and other data applications as has become commonplace with users of cellular telephones today, and (2) the "secure transactional subsystem" which may also be known as the "payment subsystem". It is contemplated that this secure transactional subsystem will preferably include a Secure Element, similar (if not identical) to that described as part of the Global Platform 2.1.X, 2.2, or 2.2.X (www.globalplatform.org). The secure element has been implemented as a specialized, separate physical memory used for industry common practice of storing payment card track data used with industry common point of sale; additionally, other secure credentials that can be stored in the secure element include employment badge credentials (enterprise access controls), hotel and other card-based access systems and transit credentials.

Mobile Network Operator

Each of the portable communications devices is connected to at least one mobile network operator. The mobile network operator generally provides physical infrastructure that supports the wireless communication services, data applications and the secure transactional subsystem via a plurality of cell towers that communicate with a plurality of portable communication devices within each cell tower's associated cell. In turn, the cell towers may be in operable communication with the logical network of the mobile network operator, POTS, and the Internet to convey the communications and data within the mobile network operator's own logical network as well as to external networks including those of other mobile network operators. The mobile network operators generally provide support for one or more communication protocols and technologies including, but not limited to, global system for mobile communication (GSM), 3G, 4G, code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols to communicate with the portable communication devices.

Retail Subsystem

Standard at merchants today is an Internet Protocol connected payment system that allows for transaction processing of debit, credit, prepay and gift products of banks and merchant service providers. By swiping a magnetic stripe enabled card at the magnetic reader of a Point of Sale Terminal, the card data is transferred to the point of sale equipment and used to confirm funds by the issuing bank. This point of sale equipment has begun to include contactless card readers as accessories that allow for the payment card data to be presented over an RF interface, in lieu of the magnetic reader. The data is transferred to the reader through the RF interface by the ISO 14443 standard and proprietary payment applications like PayPass and Paywave, which transmit the contactless card data from a card and in the future a mobile device that includes a Payment Subsystem.

A retailer's point of sale device 75 may be connected to a network via a wireless or wired connection. This point of sale network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the point of sale network may utilize any communication method that allows information to travel between the point of sale devices and financial services providers for the purpose of validating, authorizing and ultimately capturing financial transactions at the point of sale for payment via the same financial service providers.

Secure Transactional Subsystem

The system includes a secure transactional subsystem. The secure transactional subsystem includes the secure element and associated device software for communication to management and provisioning systems as well as the customer facing interface for use and management of secure data stored in the secure element. Preferably the secure transactional subsystem will conform, where appropriate, to an international standard, such as the standard defined in Global Platform 2.1.X or 2.2.

System Management Back End

Figure 1B:
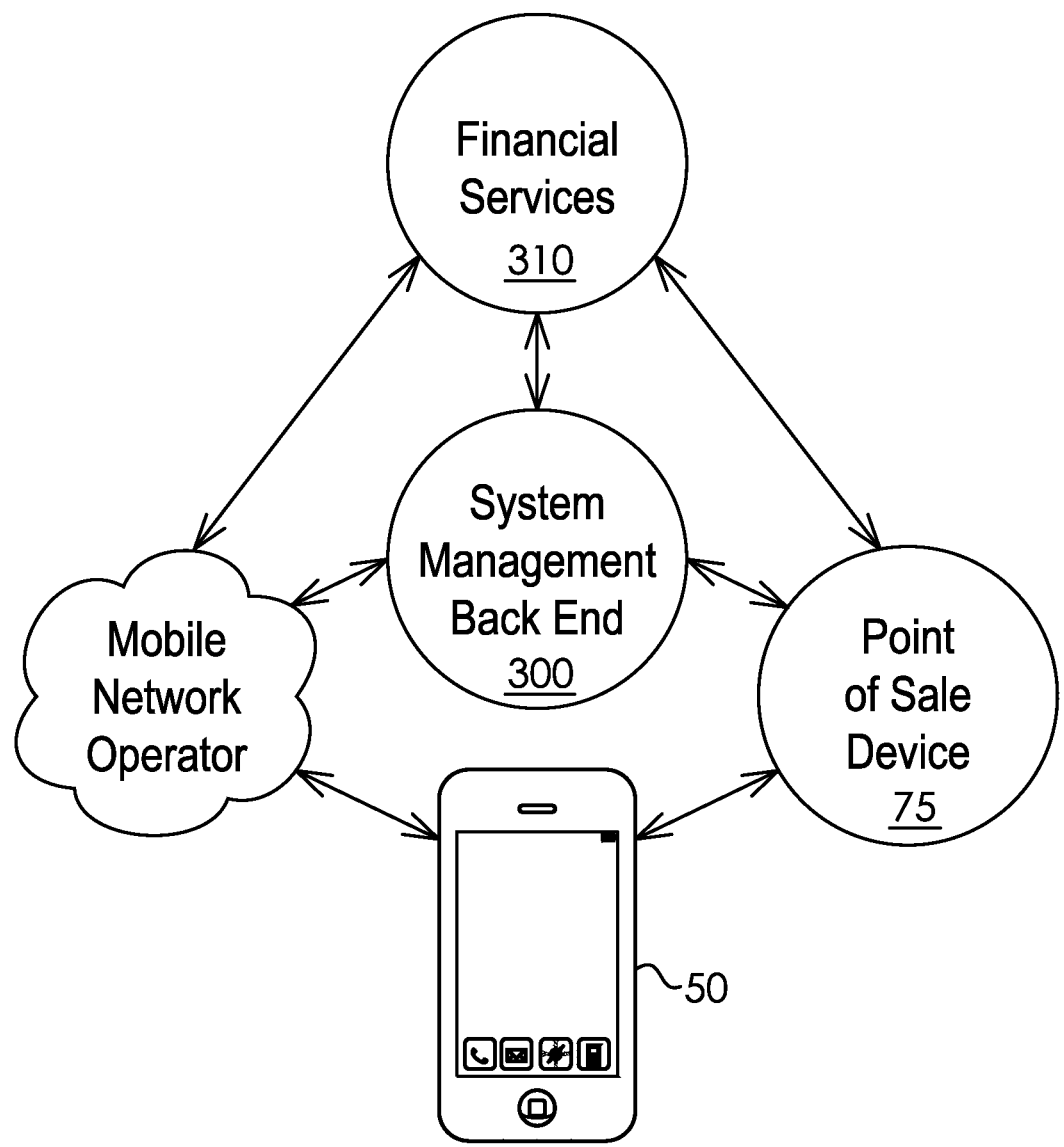
FIG. 1b illustrates the operable interconnections between the end user's smartphone and various subsystems, including the system management back end.

The system includes a system management back end. As shown in FIG. 1b, the system management back end 300 is connected to the retail subsystem, the secure transactional subsystem and to a plurality of portable communication devices via the infrastructure of at least one mobile network operator. The system management back end has a server operably communicating with one or more client devices. The server is also in operable communication with the retailer subsystem, secure transactional subsystem, and one or more portable communication devices. The server is also in operable communication with the retailer subsystem, secure transactional subsystem, and one or more portable communication devices. The communications include data and voice channels. Any type of voice channel may be used in association with the present invention, including but not limited to VoIP.

The server may comprise one or more general-purpose computers that implement the procedures and functions needed to run the system back office in serial or in parallel on the same computer or across a local or wide area network distributed on a plurality of computers and may even be located "in the cloud" (preferably subject to the provision of sufficient security). The computer(s) comprising the server may be controlled by Linux, Windows®, Windows CE, Unix, or a Java® based operating system, to name a few. The system management back end server is operably associated with mass memory that stores program code and data. Data may include one or more databases, text, spreadsheet, folder, file, or the like, that may be configured to maintain and store a knowledge base, user identifiers (ESN, IMSI, PIN, telephone number, email/IM address, billing information, or the like).

The system management back end server supports a case management system to provide call traffic connectivity and distribution across the client computers in the customer care center. In a preferred approach using VoIP voice channel connectivity, the case management system is a contact/case management system distributed by Contactual, Inc. of Redwood City, Calif. The Contactual system is a standard CRM system for a VoIP-based customer care call center that also provides flexibility to handle care issues with simultaneous payments and cellular-related care concerns. As would be understood by one of ordinary skill in the art having the present specification, drawings and claims before them other case management systems may be utilized within the present invention such as Salesforce (Salesforce.com, inc. of San Francisco, Calif.) and Novo (Novo Solutions, Inc. of Virginia Beach, Va.).

Each client computer associated with the system management back end server has a network interface device, graphical user interface, and voice communication capabilities that match the voice channel(s) supported by the client care center server, such as VoIP. Each client computer can request status of both the cellular and secure transactional subsystems of a portable communication device. This status may include the contents of the soft memory and core performance of portable communication device, the NFC components: baseband, NFC antenna, secure element status and identification.

Federated Payment Subsystem

Figure 2:
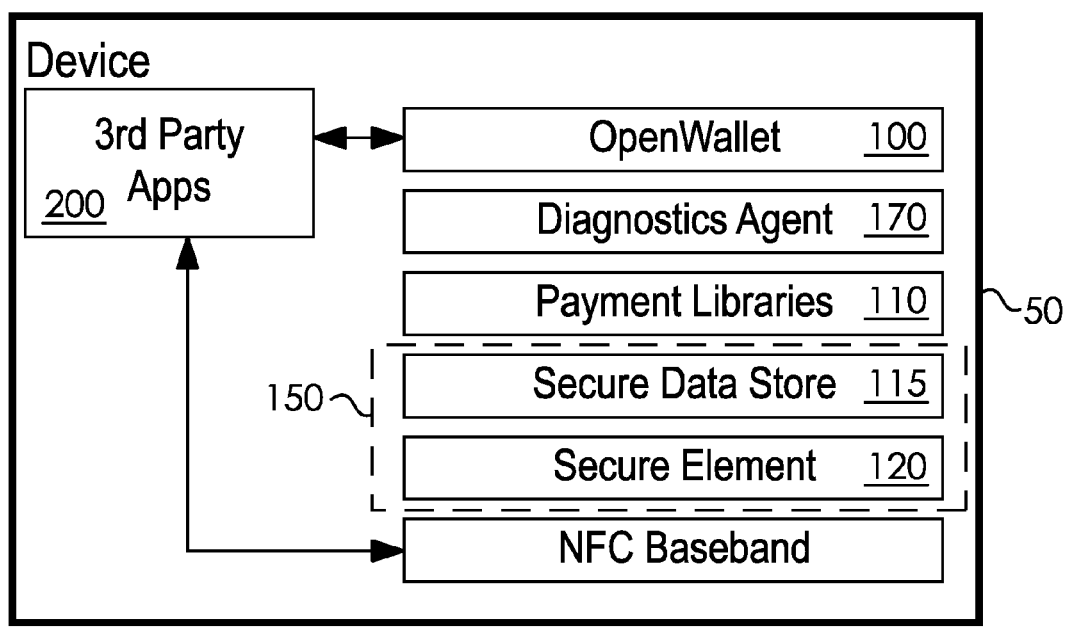
FIG. 2 is a block diagram illustrating some of the logical blocks within a portable communication device that may be relevant to the present system.

As shown in FIG. 2, each portable communication device 50 may contain one or more third party applications 200

(e.g. selected by the consumer), OpenWallet 100, payment libraries 110, secure element 120, NFC Baseband, a payment subsystem 150 (i.e. secure data store 115 and secure element 120), and diagnostic agent 170. OpenWallet 100 is a computer application that allows the consumer to see all credentials (e.g., card, coupon, access control and ticket data) stored in the device 50 (preferably in payment subsystem 150). OpenWallet 100 would also preferably track the issuers of all the credentials stored in the portable communication device's payment subsystem 150 and determine on an application-by-application basis whether that third party application should have permissions to view, select and/or change the credentials stored in the payment subsystem. In this manner, OpenWallet 100 also prevents unauthorized applications from accessing data stored in the payment subsystem 150, which they do not currently have permission to access.

The payment libraries 110 are used by OpenWallet 100 to manage (and perform housekeeping tasks on) the secure element 120, interface with the system management back end, and perform over-the-air (OTA) provisioning via data communication transceiver (including its SMS channel), on the device 50. It is contemplated that the OTA data communications will be encrypted in some manner and an encryption key will be deployed in card service module 420. The payment subsystem 150 may be used to store credentials such as payment card, coupon, access control and ticket data (e.g. transportation, concert). Some of these payment types may be added to the payment subsystem by different applications 200 for use by those applications. In this manner, other third party applications (not shown) may be precluded from accessing the payment subsystem 150.

The secure data store 115 provides secured storage on the portable communication device 50. Various levels of security may be provided depending upon the nature of the data intended for storage in secure data store 115. For instance, secure data store 115 may simply be password-protected at the operating system level of device 50. As is known in these operating systems, the password may be a simple alphanumeric or hexadecimal code that is stored somewhere on the device 50. Alternatively, the data in secure data store 115 is preferably encrypted. More likely, however, the secure data store 115 will be set up as a virtual secure element in the manner disclosed in the co-pending patent application (owned by the assignee of the present application) entitled "System and Method for Providing A Virtual Secure Element on a Portable Communication Device" filed contemporaneously herewith and hereby incorporated by reference.

OpenWallet 100 preferably removes the complexity involved in the storage, maintenance and use of credentials such as card, coupon, ticket, access control data from one or multiple sources or issuers in association with the payment subsystem 150. OpenWallet 100 also preferably enforces access control to the data stored in the payment subsystem 150 and the functions allowed by each application. In one approach, OpenWallet 100 verifies the author/issuer of each third party application stored on the portable communication device 50. This verification may be accomplished by accessing a local authorization database of permitted (i.e., trusted) applications (see FIG. 6). Under this approach, only applications that are signed with a known Issuer ID and the correctly associated Compile ID are allowed by card services module 420 to access and/or manipulate data stored in the payment subsystem 150 and/or meta data repository 125 (which stores, among other things, card image data and any embossed card data).

In other words, when an application 200 or wallet user interface 410 needs to interact with the payment subsystem 150 it does so by passing a digital identifier (such as its Issuer ID or App ID), a digital token (i.e., Compile ID or Secret Token ID), the desired action, and any associated arguments needed for the action to the card services module 420. Card services module 420 verifies the digital identifier-digital token pair matches trusted application data in the secure data table (FIG. 6), and then would issue the one or more commands necessary to execute the desired action. Among the potential actions that may be used by applications 200 or wallet user interface 410 are those associated with:

a. wallet management (e.g. setting, resetting or enabling wallet passcodes; get URL of OTA server; over-the-air registry provisioning; setting payment timing; increasing payment timing; set default card; list issuers, list supported credentials; set display sequence of credentials; set credential storage priority; create categories/folders; associate credentials with categories; memory audit; determine SE for storage of credential; get Offers; update wallet status)

b. credential management (e.g. add credential; view credential detail; delete credential; activate credential (for redemption/payment); deactivate credential; search credentials; list credential capability; set default credential; lock/unlock credential; require passcode access; get credential image; set access passcode)

c. Secure Element (SE) Management (e.g. get credential; update credential; update meta data; delete credential; wallet lock/unlock; SE lock/unlock)

d. Personalization (e.g. add credential; delete credential; suspend/unsuspend credential; notification for issuer metadata update; notification for card metadata update)

Figure 4:
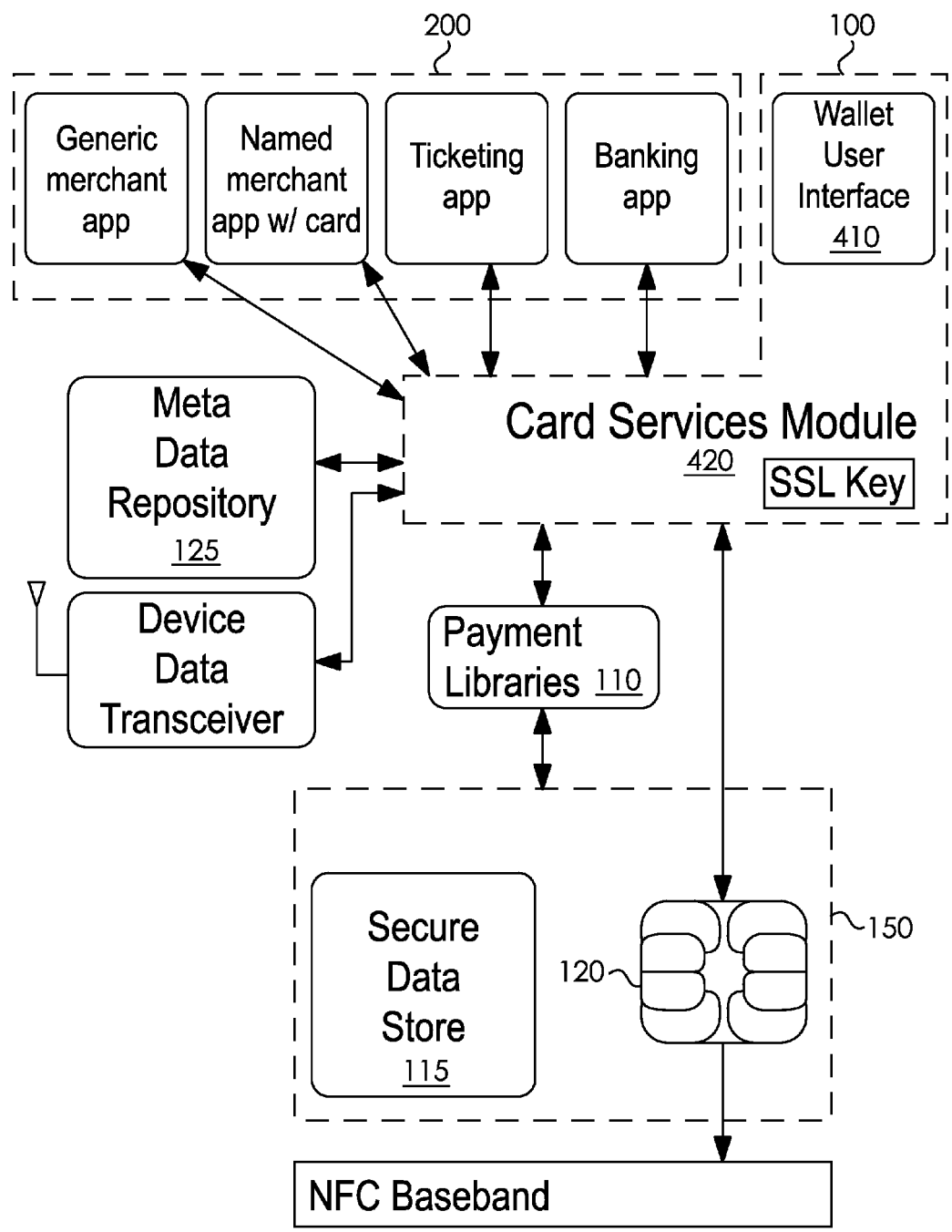
FIG. 4 is a block diagram illustrating further detail of the "OpenWallet" block of FIG. 2 that may be relevant to the present system.

FIG. 4 illustrates further detail of the "OpenWallet" block of FIG. 2. As shown, the functions of "OpenWallet" 100 can be integrated into a single dedicated module that provides a user interface that is closely coupled to the card services. In another embodiment illustrated in FIG. 4, the capabilities and functionality of OpenWallet 100 may be distributed between a Wallet User Interface 410 and a Card Services Module 420. The distributed approach would allow applications to have direct access to the Card Services Module 420 without having to use the user interface provided by Wallet User Interface 410. The Card Services Module 420 may be configured to track the issuer of all card, coupon, access and ticket data stored in the payment subsystem 150 of the portable communication device 50 and determine on an application-by-application basis whether an application should have permissions to view, select, use and/or change secure data stored in the payment subsystem. The wallet user interface 410 provides a user interface through which a user may register, provision, access and/or use the information securely stored in association with the card services module 420 relating to the user's credentials. Because the wallet user interface 410 is separated from the card services module 420, the user may elect to use one of the third party applications 200 to manage information in the Card Services Module 420. As further shown in FIG. 4, metadata (such as credential logos (e.g. Amtrak®, MasterCard®, TicketMaster®, and Visa®) and affinity images (e.g. AA Advantage® and United Mileage Plus®)) may be stored in memory 125 for use by the third party apps 200 or wallet user interface 410 in rendering a more friendly user experience. As this metadata can be shared across applications, the storage needed to implement secured transaction may be minimized.

Figure 4C:
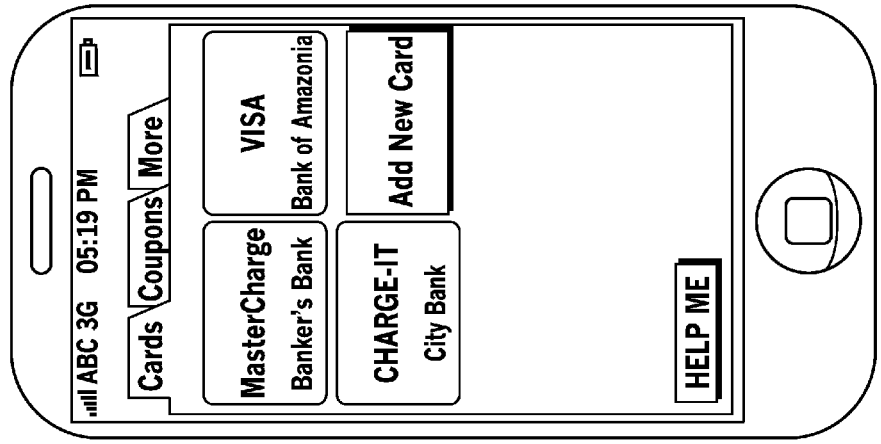
FIGS. 4A, 4B, 4C and 4d are illustrations of various screens from an exemplary wallet user interface 410 that may be deployed on a smart phone.
Figure 4B:
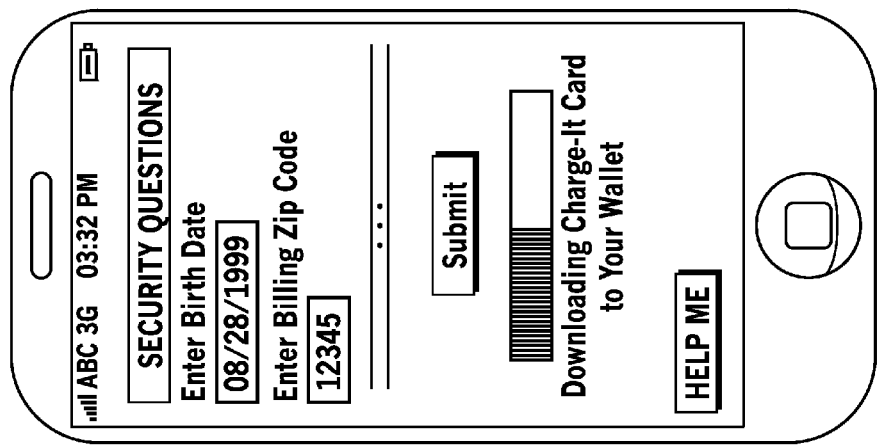
Figure 4A:
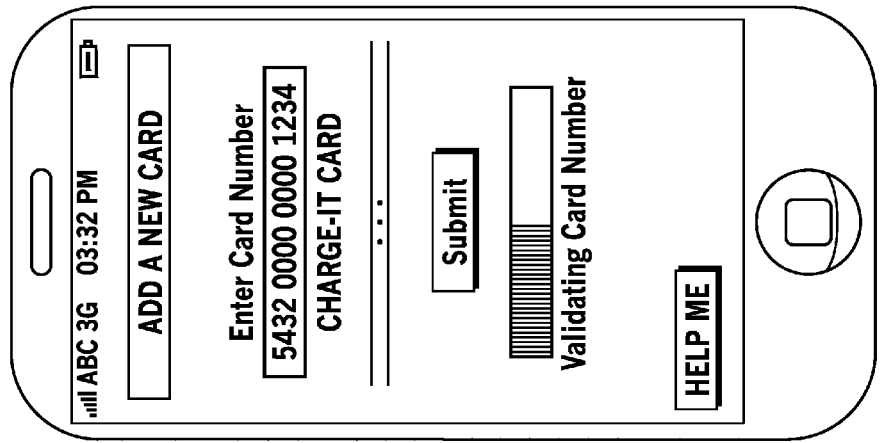
Figure 4D:
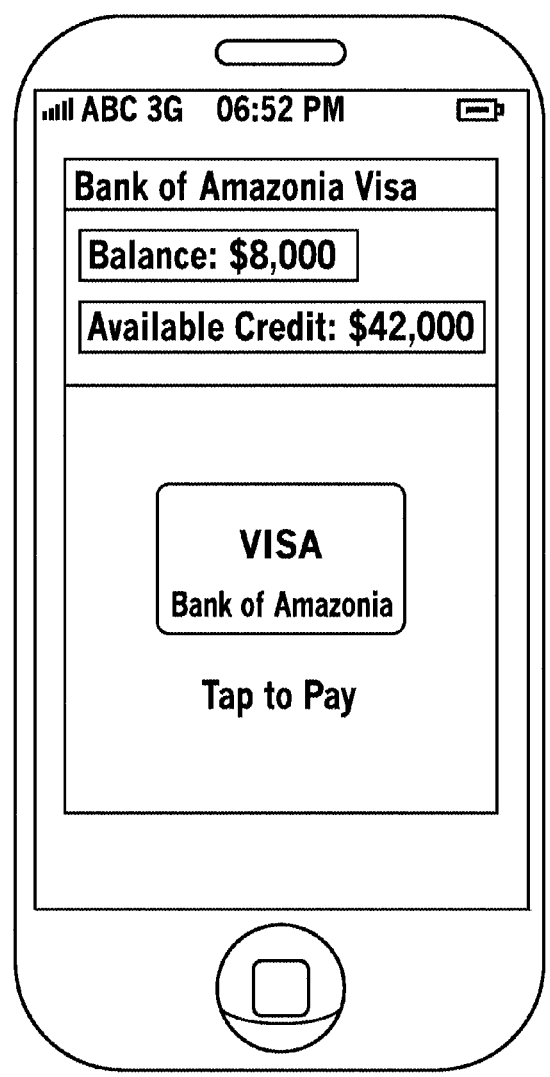

Various screen shots of one exemplary wallet user interface 410 that may be deployed on a smart phone are shown in FIGS. 4A, 4B, 4C and 4D. Among other things these figures illustrate the functionality of registering, provisioning, access and/or using information securely stored in association with the card services module 420. FIG. 4A depicts that the wallet can hold various credentials such as cards, coupons, tickets and more. FIG. 4A further depicts that multiple cards may be stored in the wallet 100. As shown in FIG. 4D, upon selecting the VISA® card from the screen illustrated in FIG. 4A, the wallet user interface opens another screen that provides an interface for the user to initiate a secure NFC payment transaction. As also depicted, the user interface may show balance and available credit information.

Credential Provisioning

Figure 5:
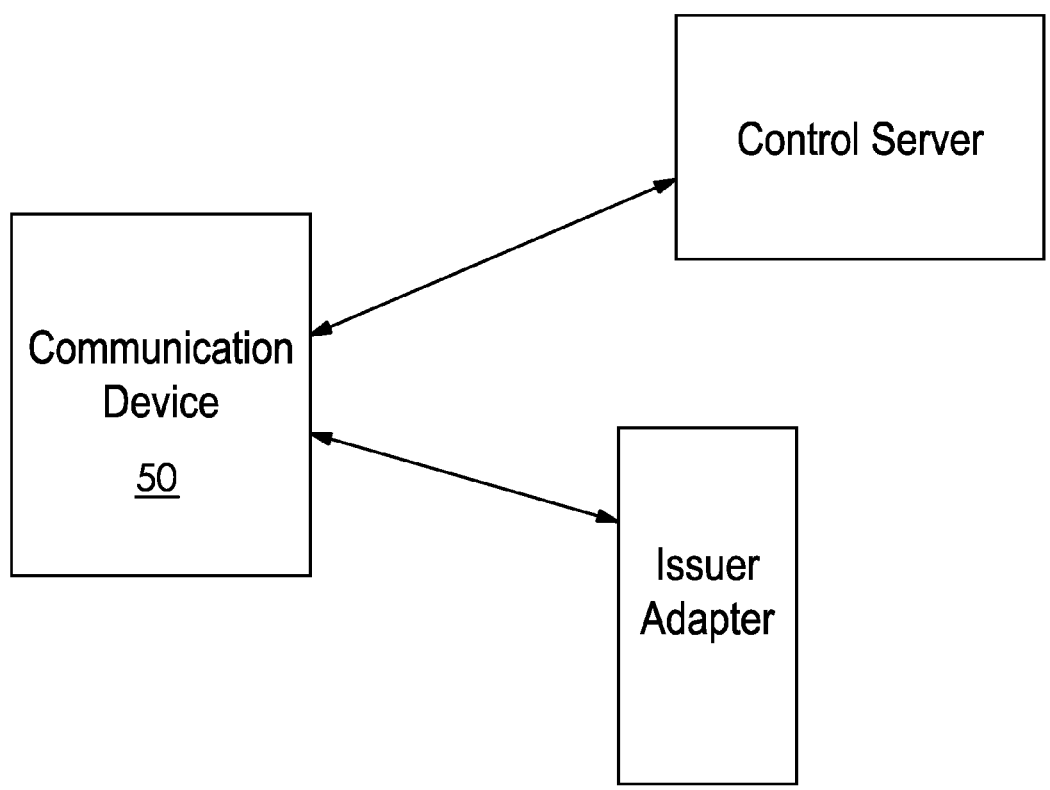
FIG. 5 is a block diagram illustrating the operable interconnections between the end user's smartphone, the control server, and the issuer server.

FIG. 5 illustrates one exemplary system architecture that may be utilized to provision credentials in the system. As shown, the user's portable communication device 50 is configured to communicate with a control server and an issuer adapter. The control server (which may alternatively be known as a Card Application Management System) is configured to validate a user's credentials. For example, if the user wishes to store information relating to a credit card in the secure element 120 of their mobile device 50, they would input their credit card information via a user interface displayed on their portable device 50.

The user interface may be generated by wallet user interface 410 or a trusted third party application 200 supported by OpenWallet 100. As an example, FIGS. 4A and 4B, illustrate the provisioning of a "Charge-It Card" into the wallet using one exemplary wallet user interface 410 that may be deployed on a smart phone. Underlying either user interface, the card services module 420 preferably transmits the first six digits of the identified credit card (commonly referred to as the Bank Identification Number or BIN) to the control server, which then validates the card issuer's compliance rules and facilitates a direct key exchange between the OpenWallet 100 (or Card Services Module 420) on the user's mobile device 50 and the appropriate issuer server in an encrypted fashion as was previously known in the art.

Various approaches to the direct key exchange may be facilitated by a variety of off-the-shelf solutions provided by entities including, but not limited to, Gemalto N.V. (Amsterdam, The Netherlands), Giesecke & Devrient (Munich, Germany), SK C&C (Korea) (Corefire), or VIVOtech Inc. of Santa Clara, Calif. (ViVoTech Issuer Server). The Issuer Server authenticates the user, executes issuer rules and then initiate the personalization process. The Issuer Server is preferably a server operated by the issuer of the credentials that the user is seeking to provision. The issuer server may verify the user, for example by providing a series of verification questions based on user information previously provided to the issuer (see FIG. 4B). Once verified, the issuer server passes the full 16 digit credit card number to the secure element 120 via the card service module 420. The issuer server may also pass metadata, such as information relating to the look and design of the selected credit card to the application memory 125. On completion, the issuer adapter would notify the control server about the completion of the transaction.

As shown in FIG. 4C, following provisioning the wallet user interface 410 would include the Charge-It Card, which the user could select using user interface techniques that are well-known in the art of smart phone user interfaces.

Validating Third Party Applications

As noted above, OpenWallet 100 verifies the trusted status of any third party application 200 before that application is allowed access to the secure element 120 (or secure data store 115 and even preferably the meta data repository 125) on the portable communication device 50 to view, select and/or change secure data stored in the payment subsystem 150. In one approach noted above, this verification may be accomplished by accessing a local authorization database of permitted or trusted applications. In a preferred approach, the local authorization database in cooperates with a remote authorization database associated with one or more servers associated with system management back end 300.

Figure 6:
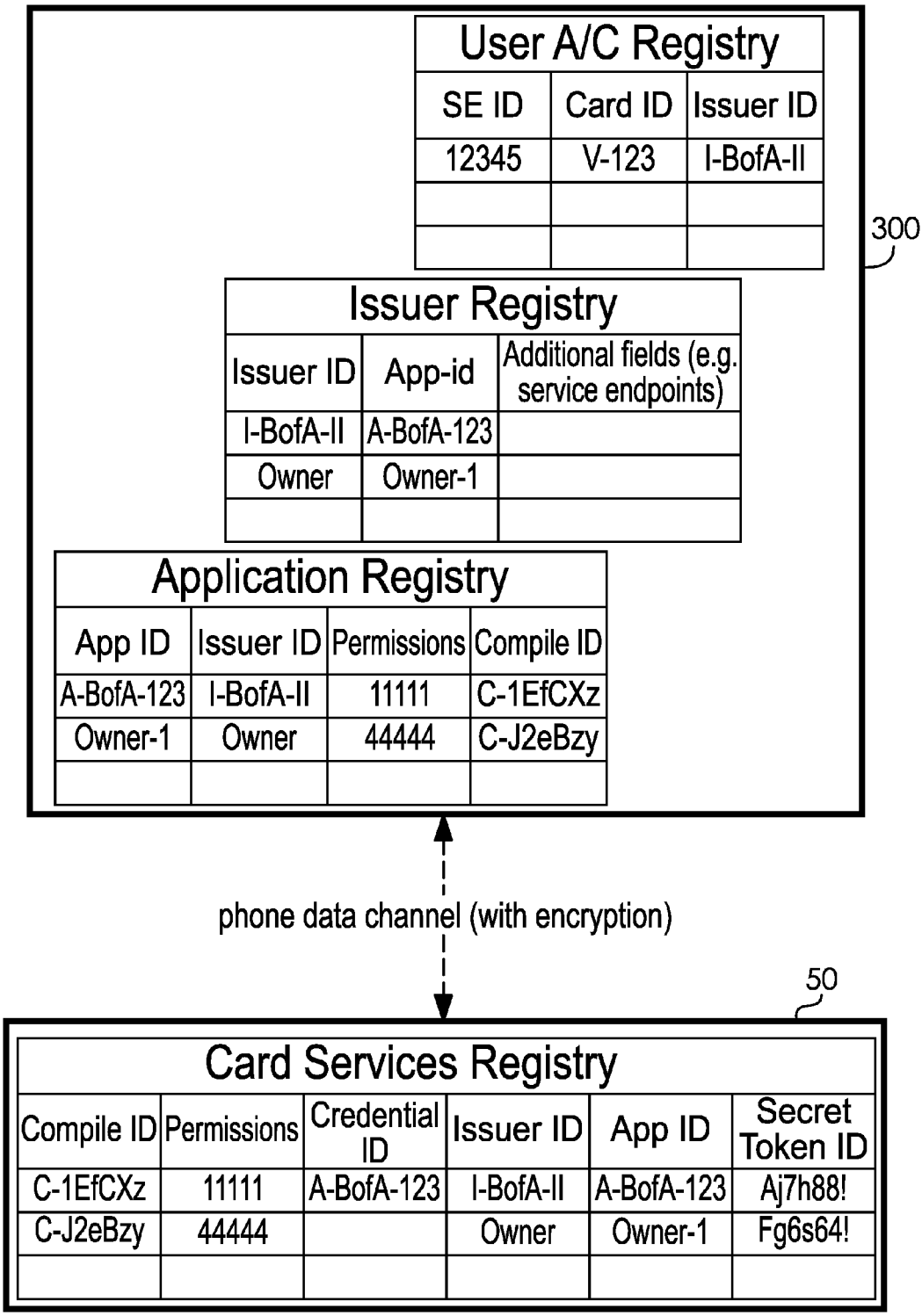
FIG. 6 is a block diagram of one potential implementation of a system underlying the grant of permission for one of the third party apps 200 to view, select and/or change secure data stored in the payment subsystem.

FIG. 6 is a block diagram of one potential implementation of one potential combination local and remote authorization databases to enhance security of the card services module 420, secure element 120, and payment subsystem 150. As shown in FIG. 6, a User A/C Registry (or User Account Registry) may be associated with the server (or otherwise deployed in the cloud). The User A/C Registry may store the identification of the secure element 120 disposed in each user's portable device 50. Entries in the User Account Registry may be added for each user at any point in the process.

The "Issuer Registry" database is a database of approved Issuers. The Issuer ID is unique for each type of credential. In other words, if a bank has multiple types of credentials (e.g. debit cards, credit cards, affinity cards, etc.) each credential type would have its own Issuer ID (e.g. I-BofA-II). In a preferred approach, the Issuer ID as between multiple types of credentials would have some common elements, so as to indicated that the credentials are at least related (e.g. I-BofA-I). In this way applications from same issuer can share data with the other application of the same "extended" issuer. In a preferred approach, card services module 420 can be simplified by requiring even the wallet user interface 410 (which "ships with the system") to have an Issuer ID (and as well as an Application ID and Compile token).

Figure 3:
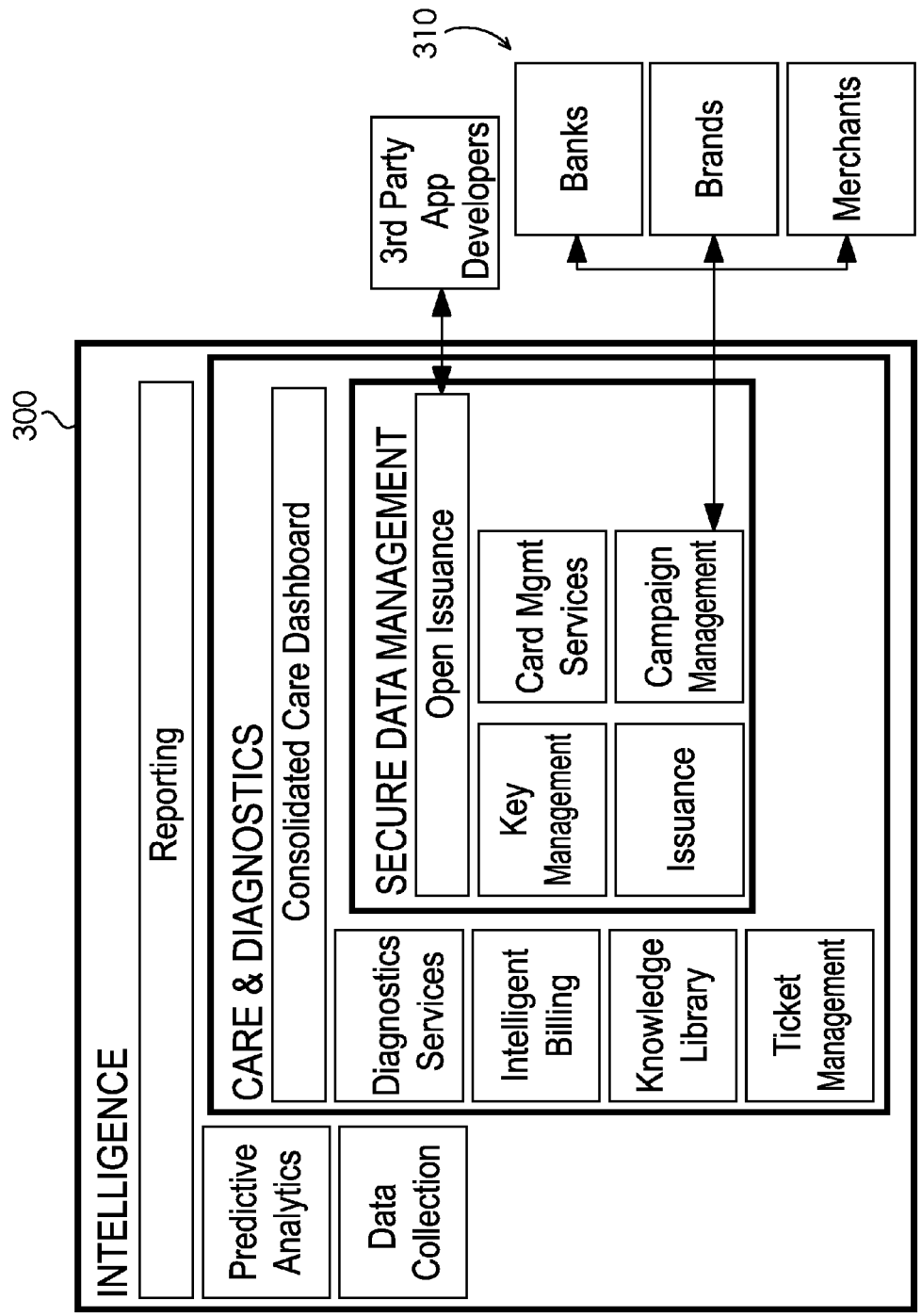
FIG. 3 is a block diagram illustrating the logical blocks within the system management back end.

The "Application Registry" is a database of applications (mostly third party) that have pre-approved by an operating system provider. Like the User A/C Registry, the "Application Registry" and "Issuer Registry" database are maintained on the server side (or otherwise in the cloud) in operable association with OpenIssuance (see FIG. 3). As would be understood by those of ordinary skill in the art having the present specification before them, the various registries may be implemented in separate databases or one unified database. At initiation of a wallet 100 and preferably at substantially regular time-intervals thereafter (e.g., daily), the data stored in the Application Registry of Open Issuance (see, FIG. 3) is distributed to devices with the wallet to be stored locally.

As shown in FIG. 6, the Application Registry may include, among other information, an Application ID ("App ID"), an Issuer ID, and a Compile ID or token. The Compile ID is a global constant generated for each application by one or more processes associated with Open Issuance (FIG. 3) during the qualification process for the particular application 200. After it is generated by a particular card services module 420 on a unique device 50, the Compile token is included or otherwise associated with the application. This Compile token is preferably generated by a pseudo-random number generator local to the device that uses a predetermined seed, such as the Application ID, Compile ID, Issuer ID or some combination thereof.

When the user seeks to qualify a third party application with the card services module 420 on a device 50, the Compile ID (a digital token) and Application ID (a digital identifier) associated with the third party application may be matched against the Compile ID and Application ID pairs stored in the Card Services Registry stored on the device 50 (see FIG. 6). As should be understood by those skilled in the art having the present specification before them, the same Compile and Application ID pairs are transmitted to other devices 50 associated with the system, as well. If the Compile ID/Application ID pair matches one of the pair-stored in the Card Services Registry on the device, a Secret Token ID is preferably generated on the device 50 by a pseudo-random number generator (such as the one associated with the Secure Element 120 and then stored in association with the Compile ID/Application ID pair in the Card Services Registry on the device 50. In some instances, the Compile ID may be pre-selected and used to seed the random number generator. It should be understood that one or more pieces of other predetermined data associated with the card services registry could be preselected as the seed instead. The card services Registry is preferably stored in secure memory (rather than the secure element 120 because secure element 120 has limited real estate) and the Card Services Registry is preferably further encrypted using standard encryption techniques. The Secret Token ID is also embedded in or otherwise associated with the application 200 on the device 50 in place of the Compile ID that was distributed with the application.

After the application has been loaded into the Card Services Registry (and the secret token embedded in the application), the third party may launch and may prompt the user to opt-in to provide access to the issuer-specific credential needed for the validated (or trusted) application. In each subsequent launch of the third party trusted application, the embedded Secret Token and/or Application ID are compared to the data in the Card Services Registry on the device. If there is match, the application is trusted and can access the payment subsystem 150 via card service module 420. In this manner, it can be seen that applications 200 or wallet user interface 410 may also be removed from the Card Services Registry and thus would be disabled from accessing the payment subsystem and possibly the application, altogether.

Card services module 420 also preferably uses the trusted application verification step to determine the appropriate level of subsystem access allowed for each application 200. For example, in one embodiment, one application 200a may be authorized to access and display all of the data contained in the payment subsystem 150, where another third party application 200x may be only authorized to access and display a subset of the data contained in the payment subsystem 150. In yet another embodiment, an application may be permitted only to send a payment or transaction requests to OpenWallet 100, but may not itself be permitted to access any of the data contained in the payment subsystem 150. In one approach, assignment of permissions to the application can be thought of as follows:

|  | Reserved | All Credentials | Extended Issuer Credentials | Own Credentials |
|---|---|---|---|---|
| Read | 0 | 0 or 1 | 0 or 1 | 0 or 1 |
| Write | 0 | 0 or 1 | 0 or 1 | 0 or 1 |
| Delete | 0 | 0 or 1 | 0 or 1 | 0 or 1 |
| Activate/ Deactivate | 0 | 0 or 1 | 0 or 1 | 0 or 1 |

-continued

|  | Reserved | All Credentials | Extended Issuer Credentials | Own Credentials |
|---|---|---|---|---|
| Download Credential | 0 | 0 or 1 | 0 or 1 | 0 or 1 |

These permission can be used to form 4 hexadecimal number in the order shown above from most to least significant figure. As shown in the example Card Services Registry of FIG. 6, the I-BofA-II issuer has permission level 11111, which can be thought to expand to 0001 0001 0001 0001 0001. In other words, the I-BofA-II application can read, write, delete, activate/deactivate, and download its own credentials but not the extended issuer credentials let alone all credentials. If BofA had another issuer code (e.g. I-BofA-I), then that would be an extended Issuer application. So, if the permission level of the application associated with Issuer ID "I-BofA-II" was set to 0010 0001 0001 0010 0001 (or 21121 hexadecimal) then the application would be able to read and activate/deactivate the credentials associated with both issuer IDs. In yet another example, the wallet user interface 410 may be given a permission level of 44444 (i.e. 0100 0100 0100 0100 0100). In other words, the wallet user interface 410 can read, write, delete, activate/deactivate, and download all credentials. As would be understood by those of ordinary skill in the art, these are merely examples of potential permissions that can be granted to applications, other permissions are contemplated. For instance, some applications may have the ability to read extended issuer credentials, but only write, delete, activate and download the application's own credentials (e.g. 21111, which expands to 0010 0001 0001 0001 0001). In yet another example, an application may only be given activate/deactivate and download rights (e.g. 0000 0000 0000 0001 0001 or 00011 in hexadecimal). In yet another example, an application may be disabled—without being deleted from the trusted application database or Card Service Registry—by setting all rights to zero.

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:
1. A system comprising:
 a secure data table including a list of one or more trusted applications each being identifiable by a paired set of digital identifier and digital token:
 a card services module configured to confirm that a first application is trusted based on determining that a first digital identifier and a first digital token associated with the first application match one of the digital identifier and digital token pairs; and a token generator configured to generate a second digital token that is a function of the first digital token in response to confirming that the first application is trusted and to store the second digital token in the secure data table in association with the first application and in place of the first digital token, wherein the card services module issues one or more commands in response to receipt of a first action in association with the presentation of the second digital token by the first application, wherein the first digital token is presented during an initial launch of the first application and in subsequent launches the second digital token is presented instead of the first digital token.

2. The system according to claim 1 further comprising means for determining that the first application is signed using a known issuer identifier.

3. The system according to claim 1 further comprising means for receiving data associated with the one or more trusted applications at periodic time intervals.

4. The system according to claim 1 wherein the first digital token is a constant associated with the first application.

5. The system according to claim 4 wherein the constant is a global constant.

6. The system according to claim 1 wherein the token generator is a pseudo-random number generator.

7. The system according to claim 6 wherein the pseudo-random number generator is associated with a secure element.

8. The system according to claim 1 wherein the token generator generates the second token based on a seed.

9. The system according to claim 8 wherein the seed is selected from the group consisting of the first digital token, the first digital identifier, an issuer of the first application, and combinations thereof.

10. The system according to claim 1, wherein the secure data table is stored in a secure memory and encrypted.

11. A computer-implemented method comprising:
storing, by a secure data table, a list of one or more trusted applications each being identifiable by a paired set of digital identifier and digital token;
confirming, by a card services module, that a first application is trusted based on determining that a first digital identifier and a first digital token associated with the first application match one of the digital identifier and digital token pairs; and
generating, by a token generator, a second digital token that is a function of the first digital token in response to confirming that the first application is trusted and storing the second digital token in the secure data table in association with the first application and in place of the first digital token, wherein the card services module issues one or more commands in response to receipt of a first action in association with the presentation of the second digital token by the first application, wherein the first digital token is presented during an initial launch of the first application and in subsequent launches the second digital token is presented instead of the first digital token.

12. The method according to claim 11 further comprising receiving data associated with the one or more trusted applications at periodic time intervals.

13. The method according to claim 11 further comprising determining that the first application is signed using a known issuer identifier.

14. The method according to claim 11 wherein the first digital token is a constant associated with the first application.

15. The method according to claim 14 wherein the constant is a global constant.

16. The method according to claim 11 wherein the token generator is a pseudo-random number generator.

17. The method according to claim 16 wherein the pseudo-random number generator is associated with a secure element.

18. The method according to claim 11 further comprising generating, by the token generator, the second token based on a seed.

19. The method according to claim 18 further comprising selecting the seed from the group consisting of the first digital token, the first digital identifier, an issuer of the first application, and combinations thereof.

20. The method according to claim 11, further comprising storing the secure data table in a secure memory, wherein the secure data table is encrypted.

* * * * *